United States Patent [19]

Dugan, Jr.

[11] Patent Number: 4,583,313
[45] Date of Patent: Apr. 22, 1986

[54] FISHING LURE

[76] Inventor: Clifton J. Dugan, Jr., 9117 Brady, Dallas, Tex. 75243

[21] Appl. No.: 607,788

[22] Filed: May 7, 1984

[51] Int. Cl.$^4$ ............................................. A01K 79/00
[52] U.S. Cl. .................................................... 43/17.1
[58] Field of Search .................... 43/17.1, 26.2, 42.31; 310/320, 321; 367/152, 162, 176

[56] References Cited

U.S. PATENT DOCUMENTS

| | | | |
|---|---|---|---|
| 2,577,229 | 12/1951 | Carnes | 43/17.1 |
| 2,757,475 | 8/1956 | Pankove | 43/17.1 |
| 2,784,399 | 3/1957 | Smith | 43/17.1 |
| 2,920,318 | 1/1960 | Balcken et al. | 43/17.1 |
| 3,683,356 | 8/1972 | D'Amore | 43/17.1 |
| 3,885,338 | 5/1975 | York | 43/17.1 |
| 4,380,132 | 4/1983 | Atkinson | 43/26.2 |

FOREIGN PATENT DOCUMENTS 513681 6/1976 U.S.S.R. ............................ 43/17.1

Primary Examiner—Nicholas P. Godici
Assistant Examiner—M. Jordan
Attorney, Agent, or Firm—Jay M. Cantor

[57] ABSTRACT

The disclosure relates to a fishing lure capable of emitting tones of a single predetermined frequency, plural predetermined frequencies or to sweep through plural frequencies in a predetermined frequency band. This is accomplished by providing a fishing lure in the shape of a worm, small fish, insect or the like having contained therein, in a water tight compartment, within which are disposed an integrated circuit which drives a piezoelectric transducer, passive circuit elements coupled to the integrated circuit to control the frequency of the signal output therefrom for providing appropriate signals to the piezoelectric or piezoceramic device for emitting a predetermined frequency or frequencies as noted above therefrom and a battery for powering the circuit. The fishing lure also contains the piezo electric device either in the water tight compartment or external thereof. The fishing lure is also supplied with a hook or hooks depending therefrom as well as a sinker element, if necessary. The fishing lure of the present invention is therefor capable of driving the piezo electric transducer such that it emits a predetermined signal frequency tone or a predetermined group of frequencies within a desired frequency band for the type of fish of interest. With present day circuits it is possible to provide frequencies up to about 100 kilohertz and provide quite clear tones, thus targeting each species of fish as to its tone preference. The tones generally utilized will fall below 20 kilohertz.

7 Claims, 2 Drawing Figures

FISHING LURE

BACKGROUND OF THE INVENTION

1. Field of the Invention

This invention relates to a fishing lure and, more specifically, to a fishing lure capable of emitting sounds of a predetermined single frequency or plural frequencies in a predetermined frequency band simultaneously or in a sweeping manner.

2. Description of the Prior Art

Fishing lures capable of emitting sound have been known in the prior art. The approach utilized in such prior art sound emitting lures has been to provide a vibrator which has a limited operating frequency and which emits mostly noise as opposed to a clear tone of one frequency or plural frequencies simultaneously or in a sweeping manner in a predetermined frequency band. This inability to provide a clear tone of predetermined frequency or group of frequencies results in a limited ability to attract fish when in use. The reason for this problem is that fish of different species each appear to be attracted to a particular single frequency or to a group of frequencies in a well defined frequency band. It is therefor necessary that the frequency or frequencies emitted by the fishing lure be within the frequency band required for catching the fish species of interest as well as to attract the fish in general. As stated above, the prior art noise producing fishing lures have been incapable of providing the type of tone required for providing a high rate of attraction for a fish.

SUMMARY OF THE INVENTION

In accordance with the present invention, the above problem of the prior art is minimized and there is provided a fishing lure capable of emitting tones of a single predetermined frequency, plural predetermined frequencies or to sweep through plural frequencies in a predetermined frequency band. Briefly, this is accomplished by providing a fishing lure in the shape of a worm, small fish, insect or the like having contained therein, in a water tight compartment, within which are disposed an integrated circuit which drives a piezo electric transducer, passive circuit elements coupled to the integrated circuit to control the frequency of the signal output therefrom for providing appropriate signals to the piezoelectric or piezoceramic device for emitting a predetermined frequency or frequencies as noted above therefrom and a battery for powering the circuit. The fishing lure also contains the piezo electric device either in the water tight compartment or external thereof. The fishing lure is also supplied with a hook or hooks depending therefrom as well as a sinker element, if necessary. The fishing lure of the present invention is therefor capable of driving the piezo electric transducer such that it emits a predetermined signal frequency tone or a predetermined group of frequencies within a desired frequency band for the type of fish of interest. With present day circuits it is possible to provide frequencies of up to about 100 kilohertz and provide quite clear tones, thus targeting each species of fish as to its tone preference. The tones generally utilized will fall below 20 kilohertz.

DESCRIPTION OF THE PREFERRED EMBODIMENT

Figure 1:
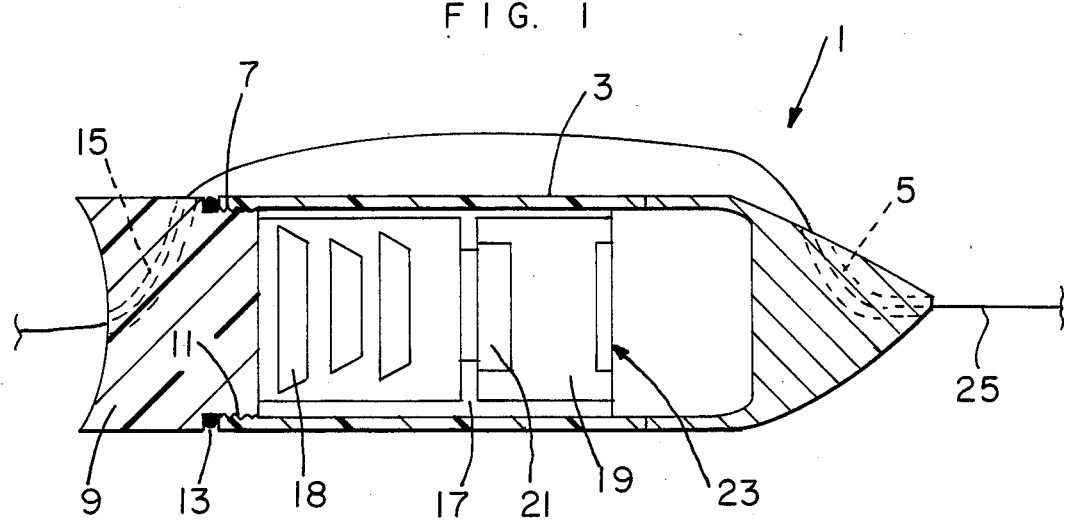
FIG. 1 is a cross-sectional view of a fishing lure in accordance with the present invention.

Referring now to FIG. 1, there is shown a cross section of one embodiment of a fishing lure utilizing the invention herein. There is shown the fishing lure 1 which includes a casing 3 having an aperture 5 passing through the front end thereof and a threaded portion 7 at the rear section thereof with a grooved area for receiving an O-ring 13 therein. A back battery cover 9 having a threaded portion 11 thereon threads onto the thread 7 with the O-ring 13 therebetween. The back cover 9 includes a aperture 15 passing therethrough.

Within the fishing lure 1 is a battery case or compartments 17 which includes the batteries 18 therein. The battery case or compartments 17 is made water tight by virtue of the O-ring 11 and the threaded back battery cover 9 threaded onto threads 7 of the lure casing 3. A further compartment 19 is provided within the casing 3 which is capable of receiving a printed circuit board or of mounting an integrated circuit 21 with passive elements (not shown) directly therein. The integrated circuit 21 is shown mounted within the compartment 19 and the piezo electric transducer 23 is also shown mounted in the chamber 19. A fishing line 25 is shown passing through the aperture 15 and the aperture 5 for securing the lure 1 of the fishing line in standard manner. Hooks (not shown) are mounted onto the casing 3 in standard manner to provide the completed lure.

In operation, the batteries 18 are placed within the battery case 17 and the end cap 9 with the O-ring 13 therein is threaded onto the threads 7 of the casing 3 by means of the threads 11. This will cause power to be supplied to the integrated circuit 21 and passive element attached thereto, if any, to provide an electric signal of predetermined frequency or group of frequencies which are either constantly emitted or swept through, as determined by the passive elements and the integrated circuit itself, to the piezo ceramic transducer 23. This causes the piezo ceramic transducer to emit a substantially single frequency tone or a plurality of tones of different frequencies within a predetermined frequency band as determined by the value of the passive components.

While the preferred embodiment does not show the capability of varying the frequency output of the piezo ceramic transducer 23, it should be understood that variable passive components can be utilized within the chamber 19 and accessible therein or from an external portion of the casing to vary the frequency of the tone or tones emitted by the piezo ceramic transducer. In this manner, a single lure can be utilized, effectively attracting fish of different species which are responsive to different tonal frequencies. A further alternative as noted above is to provide appropriate circuitry in the chamber 19 whereby the piezo ceramic transducer 23 can be swept through a range of frequencies in a predetermined frequency band, this also having been found to be an attraction to fish of certain species.

Figure 2:
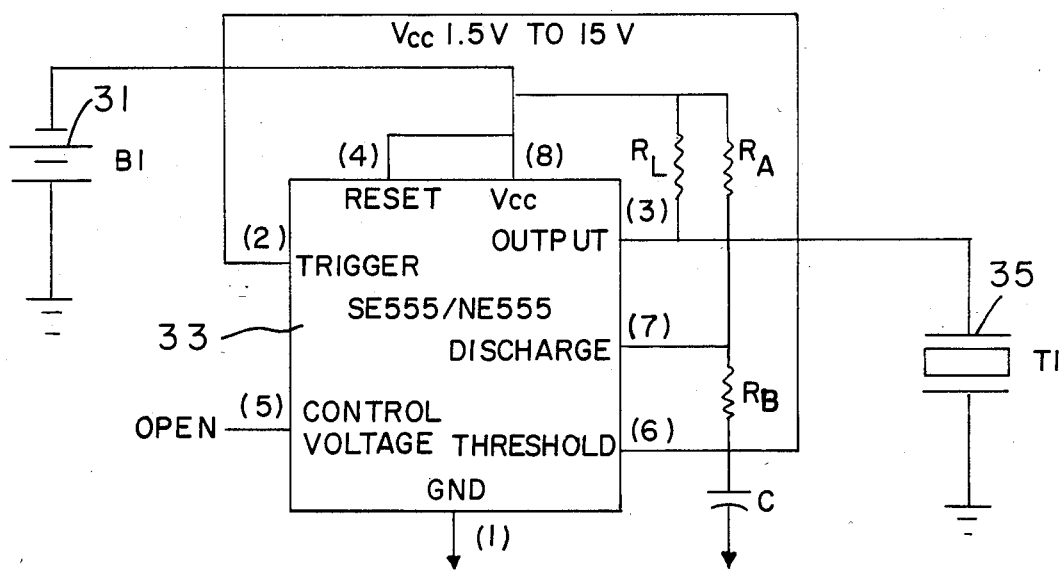
FIG. 2 is a circuit diagram of a circuit for producing a tone for use in the present invention.

Referring now to FIG. 2, there is shown a specific integrated circuit with attached battery and piezo ceramic transducer which performs the functions described hereinabove. The circuit includes a battery 31 which is coupled to the Vcc and RESET outputs of a type SE 555/NE555 precision timer integrated circuit 33. A load resistor $R_L$ is provided between the battery negative terminal and the output terminal of the integrated circuit 33. Also, a resistor $R_A$ is provided between the battery negative terminal and the discharge terminal of the integrated circuit 33 and a further resistor $R_B$ is positioned between the discharge terminal and the threshold terminal of the integrated circuit. The threshold terminal of the integrated circuit is coupled to ground through a capacitor C. The output terminal of the integrated circuit 33 is coupled to a piezo ceramic transducer 35 which is solid state and flexes at the frequency of the drive signal received from the integrated circuit. All of the elements described in FIG. 2 are individually well known in the art. The circuit as described in FIG. 2 will be utilized to provide a free running oscillator which is capable of being programmed by changing the values of $R_A$, $R_B$ and C to run at any frequency desired from 1 hertz to 100 kilohertz. The output wave form will be a square wave which will cause the piezo ceramic transducer 35 to produce a sound by flexing.

It can be seen that there has been provided a compact electronic circuit for use in conjunction with fishing lures wherein the fishing lure will emit tones of a predetermined frequency or frequencies or will sweep frequencies in a predetermined frequency band rather than emitting noise as is evidenced by the prior art. In this way, the efficiency obtained in catching of fish is materially increased.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

What is claimed is:

1. A fishing lure for attracting a predetermined species of fish which comprises, in combination,
   (a) a waterproof casing,
   (b) a sound emitting transducer coupled to said casing, and
   (c) electronic means within said casing and coupled to said sound emitting transducer for automatically causing said transducer to emit sounds of plural predetermined frequencies simultaneously.

2. A fishing lure as set forth in claim 1 wherein said casing is watertight and said transducer is disposed within said casing.

3. A fishing lure as set forth in claim 1 wherein said casing is watertight and said transducer is disposed within said casing.

4. A fishing lure as set forth in claim 2 wherein said casing further includes a battery compartment hermetically isolated from said electronic means and means to hermetically seal batteries in said battery compartment.

5. A fishing lure as set forth in claim 3 wherein said casing further includes a battery compartment hermetically isolated from said electronic means and means to hermetically seal batteries in said battery compartment.

6. A fishing lure as set forth in claim 4, wherein means to hermetically seal includes a threaded region in said battery compartment, a battery cover threadedly engaging said threaded region and an O-ring positioned between said battery cover and said battery compartment.

7. A fishing lure as set forth in claim 5 wherein means to hermetically seal includes a threaded region in said battery compartment, a battery cover threadedly engaging said threaded region and an O-ring positioned between said battery cover and said battery compartment.

* * * * *